United States Patent Office 3,219,621
Patented Nov. 23, 1965

3,219,621
STABILIZATION OF OXYMETHYLENE COPOLYMERS BY 2-HYDROXY BENZOPHENONES
John Henry Prichard, Springfield, N.J., assignor to Celanese Corporation of America, New York, N.Y., a corporation of Delaware
No Drawing. Filed Apr. 30, 1962, Ser. No. 191,259
4 Claims. (Cl. 260—45.95)

This invention relates to polymers which are structurally related to polyoxymethylene and particularly to polymers having good resistance to weathering. This invention also relates to a method for improving the resistance to weathering of polymers.

Polyoxymethylene polymers, having recurring

—CH$_2$O— units have been known for many years. They may be prepared by the polymerization of trioxane which is a cyclic trimer of formaldehyde. Polyoxymethylene varies in molecular weight, depending on its method of preparation.

High molecular weight solid polyoxymethylenes have been prepared by polymerizing trioxane in the presence of certain fluoride catalysts such as antimony fluoride and may also be prepared in high yields and at rapid reaction rates by the use of catalysts comprising boron fluoride coordination complexes with organic compounds, as described in Patent No. 2,989,506 of Donald E. Hudgin and Frank M. Berardinelli. Boron fluoride gas is also a rapid and effective catalyst, as disclosed in Patent No. 2,989,507 of also Hudgin and Berardinelli. A group of oxymethylene polymers containing repeating carbon-to-carbon single bonds in the polymer chain prepared for example by copolymerizing trioxane and any of various cyclic ethers such as ethylene oxide or dioxalane is disclosed in Patent No. 3,027,352 of Walling et al. Such copolymers may be described as having at least one chain containing from about 85 to about 99.6 mol percent of oxymethylene units interspersed with between about 0.4 and about 15 mol percent of —O—R— units wherein R is a divalent radical containing at least 2 carbon atoms directly linked to each other and positioned in the chain between the two valences, with any substituents on the R radical being inert. The preferred copolymers have melting points of at least 150° C.

Other methods of preparing oxymethylene polymers are disclosed by Kern et al. in Angewandte Chemi 73(6) 177–186 (March 21, 1961), including polymers containing repeating carbon-to-carbon single bonds in the polymer chain by copolymerizing trioxane with cyclic ethers such as dioxane, lactones such as beta-propiolactone, anhydrides such as cyclic adipic anhydride and ethylenically unsaturated compounds such as styrene, vinyl acetate, vinyl methyl ketone, acrolein etc.

While resinous oxymethylene polymers such as those described above are satisfactory in many applications, there exist uses for which it is desirable that their resistance to weathering be increased. Furthermore, it is desirable that this increase in resistance to weathering be accompanied by a satisfactory level of thermal stability. By "weathering" is meant exposure to a combination of light rays including ultraviolet, oxygen, and water such as is likely to occur in the outdoors.

In accordance with one aspect of the invention a 2-hydroxy benzophenone is mixed with an oxymethylene polymer having repeating carbon-to-carbon single bonds in the main polymer chain to yield a mixture having improved resistance to weathering and a satisfactory level of thermal stability.

The admixture of a 2-hydroxy benzophenone with an oxymethylene homopolymer produces a product of improved resistance to weathering. However, this is only accomplished in conjunction with an undesirable decrease in thermal stability despite the presence of thermal stabilizers. This degree of decrease in thermal stability does not occur with the products of this invention.

It appears that the susceptibility of polyoxymethylene polymers to resistance to weathering without undue decrease in thermal stability by the addition of a 2-hydroxy benzophenone is greatly enhanced by incorporating into the polymer units derived from cyclic ethers having at least two adjacent carbon atoms.

A preferred group of polymers intended to be utilized in accordance with this invention are oxymethylene-cyclic ether copolymers having a structure comprising recurring units having formula

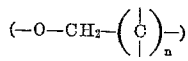

wherein $n$ is an integer from zero to 5 and wherein $n$ is zero in from 60 to 99.6 percent of the recurring units.

A preferred class of copolymers are those having a structure comprising recurring units having the formula (—O—CH$_2$—(CH$_2$)$_n$—) wherein $n$ is an integer from zero to 2 and wherein $n$ is zero in from 60 to 99.6 percent of the recurring units. These copolymers are prepared by copolymerizing trioxane with a cyclic ether having the structure

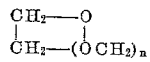

where $n$ is an integer from zero to two.

Among the specific cyclic ethers which may be used are ethylene oxide, 1,3-dioxolane, 1,3,5-trioxepane, 1,3-dioxane, trimethylene oxide, pentamethylene oxide, 1,2-propylene oxide, 1,2-butylene oxide, neopentyl formal, pentaerythritol diformal, paraldehyde, tetrahydrofuran, and butadiene monoxide.

The preferred catalysts used in the preparation of the desired copolymers are the boron fluoride coordinate complexes with organic compounds in which oxygen or sulfur is the donor atom.

The coordination complexes of boron fluoride may, for example, be a complex with a phenol, an ether, an ester, or a dialkyl sulfide. Boron fluoride dibutyl etherate, the coordination complex of boron fluoride with dibutyl ether, is the preferred coordination complex. The boron fluoride complex with diethyl ether is also very effective. Other boron fluoride complexes which may be used are the complexes with methyl acetate, with ethyl acetate, with phenyl acetate, with dimethyl ether, with methylphenyl ether and with dimethyl sulfide.

The coordination complex of boron fluoride should be present in the polymerization zone in amounts such that its boron fluoride content is between about 0.0001 and about 1.0 weight percent based on the weight of the monomers in the polymerization zone. Preferably, amounts between about 0.003 and about 0.03 weight percent should be used in a continuous process.

The monomers in the reaction zone are preferably anhydrous or substantially anhydrous. Small amounts of moisture, such as may be present in commercial grade reactants or may be introduced by contact with atmospheric air will not prevent polymerization, but should be essentially removed for best yields.

In a specific embodiment of this invention, the trioxane, cyclic ether and catalyst are dissolved in a common anhydrous solvent, such as cyclohexane and permitted to react in a sealed reaction zone. The temperature in the reaction zone may vary from about 0° C. to about 100° C. The period of reaction may vary from about 5 minutes to about 72 hours. Pressures from sub-atmospheric to about 100 atmospheres, or more may be used, although atmospheric pressure is preferred.

It has been found that the relatively minor amounts of the cyclic ether other than trioxane used in the copolymerization reaction generally disappear completely from the reaction mixture. The required ratio of trioxane to cyclic ether in the reaction mixture may therefore be roughly predetermined for a desired mol ratio in the polymer by assuming that all of the cyclic ether is used up and by assuming a particular conversion level from previous experience under substantially comparable conditions.

The chemical constitution of the cyclic ether must also be considered. Thus, 1,3-dioxolane contains both an oxymethylene group and a oxyethylene group. Its incorporation into the copolymer molecule introduces oxyethylene groups into the polymer molecule.

In general, the cyclic ether is present in the reaction mixture in the amounts between about 0.2 and about 30 mol percent, based on the total mols of monomer. The optimum proportion will depend on the particular copolymer desired, the expected degree of conversion and the chemical constitution of the cyclic ether used.

The copolymers produced from the preferred cyclic ethers in accordance with this invention have a structure substantially composed of oxymethylene and oxyethylene groups in a ratio from about 250:1 to about 1.5:1.

Upon completion of the polymerization reaction it is desirable to neutralize the activity of the polymerization catalyst since prolonged contact with the catalyst degrades the polymer. The polymerization product may be treated with an aliphatic amine, such as tri-n-butyl-amine, in stoichiometric excess over the amount of free catalyst in the reaction product, and preferably in an organic wash liquid which is a solvent for unreacted trioxane. Or, if desired, the reaction product may be washed with water which neutralizes catalyst activity. A detailed description of the methods of neutralizing catalyst activity may be found in U.S. Patent 2,989,509 by Donald E. Hudgin and Frank M. Berardinelli.

Some 2-hydroxy benzophenones which can be used, for example, are, those in which at least one hydrogen atom of 2-hydroxy benzophenone is substituted with, for example, alkoxy e.g. containing up to 12 carbon atoms such as methoxy, butoxy, octoxy or dodecoxy, halogen such as chloro and additional hydroxy groups and/or alkyl groups, e.g. containing up to 12 carbon atoms. It is preferable that the substituents be in the 4,2′ or 4′ positions of the compound.

Some specific 2-hydroxy benzophenones contemplated are 2-hydroxy-4-methoxy benzophenone, 2-hydroxy-4-methoxy-4′-chloro benzophenone, 2-hydroxy-4-n-octoxy benzophenone, 2,2′-dihydroxy benzophenone, 2,2′-dihydroxy - 4 - methoxy benzophenone, 2,2′ - dihydroxy-4-n-octoxy benzophenone, 2,2′-dihydroxy-4-n-dodecoxy benzophenone, and 2,6-dibenzoyl resorcinol. The 2-hydroxy benzophenone may be used in an amount, for example of 0.2 to 5 percent preferably 0.5 to 2 percent based on the weight of the copolymer.

In accordance with another aspect of the invention, compositions having particularly good thermal stability in addition to good weathering resistance are prepared by adding to the copolymer-2-hydroxy benzophenone composition, as a thermal stabilizer, a phenolic compound and an amidine compound.

The phenolic compound is preferably an alkylene bisphenol including alkylene bisphenols with alkyl substituents on the benzene rings. A suitable class of alkylene bisphenols include compounds having from 1 to 4 carbon atoms in the alkylene group and having from zero to 2 alkyl substituents on each benzene ring, each alkyl substituent having from one to 4 carbon atoms. Some alkylene bisphenols which may be used are 2,2′-methylene-bis-(4-methyl-6-tertiary butyl phenol), 2,2′-methylene-bis-[4-methyl-6-(1-methyl cyclohexyl) phenol], 2,6-bis(2′-hydroxy-3′-tertiary butyl-5′-methylbenzyl)-4-methyl phenol. The preferred alkylene bisphenol is 2,2′-methylene-bis(4-methyl-6-tertiary butyl phenol) which has been found to be substantially more effective than even its homolog 2,2′-methylene-bis-(4-ethyl-6-tertiary butyl phenol).

Other phenolic compounds which may be used are alkyl phenols the alkyl groups of which have up to 7 carbon atoms, e.g. 2,6-ditertiary butyl-4-methyl phenol.

The phenolic compound is generally used in amounts not exceeding 5 percent, based on the weight of the copolymer. Preferably amounts between about 2 and about 0.2 weight percent are used.

The contemplated amidine compounds have a carbon atom doubly bonded to one nitrogen atom and singly bonded to another. A preferred class of amidine compounds are the N-substituted amidine compounds wherein another nitrogen atom is singly bonded to the amidine group, most preferably at the carbon atom.

Suitable amidine compounds include the cyanoguanidine compounds including cyanoguanidine, itself, and other compounds containing the divalent radical:

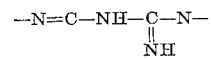

Among the suitable substituted cyanoguanidines which may be used are those having one or two substituents at the 3-nitrogen position of the guanidine nucleus, including alkyl, aryl, cycloalkyl, hydroxyalkyl, haloalkyl, haloaryl and other substituents. Specific compounds which are suitable include 1-cyano-3 methyl guanidine, 1-cyano-3 ethyl guanidine, 1-cyano-3 isopropyl guanidine, 1-cyano-3, 3-diphenyl guanidine, 1-cyano-3-hydroxymethyl guanidine, 1-cyano-3-dodecyl guanidine, 1-cyano-3-(2-hydroxyethyl) guanidine, 1-cyano-3-(2-bromoethyl) guanidine, 1-cyano-3-(m-chlorophenyl) guanidine and 1,3-dicyanoguanidine.

Polyaminotriazoles comprise another suitable class of amidine compounds.

Polyaminotriazoles are suitably prepared by heating a mixture of a dihydrazide of a dicarboxylic acid with aqueous hydrazine hydrate. For a particular dihydrazide, the molecular weight of the product will depend upon the temperature of the reaction, the proportion of water and the duration of the reaction. Higher temperatures, lower proportions of water and longer reaction periods are conducive to higher molecular weights.

The preferred class of polyaminotriazoles are those having structural units of the formula

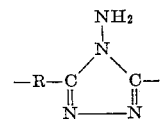

wherein R is an alkylene group of 6 to 12 carbon atoms. They are prepared as described above, utilizing as reactants the dihydrazides of dialkanoic acids having from 8 to 14 carbon atoms. Among the preferred dihydrazides are isosebacic dihydrazide, sebacic dihydrazide, azelaic dihydrazide, suberic dihydrazide, adipic dihydrazide, methyl adipic dihydrazide, decanedioic and undecanedioic dihydrazide.

Other polyaminotriazoles which may be used contain structural units of the formula

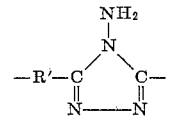

wherein R′ is a divalent organic radical free from reactive groups and having two terminal carbon atoms through which it is joined to the triazole rings. In addition to the preferred class of polyaminotriazoles described above, other polyaminotriazoles having the structure described immediately above may be prepared from the dihydrazides of acids such as the following:

Isophthalic acid
Terephthalic acid
Phenylene diacetic acids
Phenylene dipropionic acids
Phenylene dibutyric acids
p,p'-Dicarboxy-1,5-diphenoxypentane
p,p'-Dicarboxy-1,4-diphenoxybutane
p,p'-Dicarboxy-diphenoxymethane
p-Carboxy-5-phenoxymethyl pyromucic acid
Thio bis cenanthic acid
Thio bis caproic acid
Sulfone bis caproic acid
Thio bis valeric acid
Sulfone bis propionic acid
Thio bis butyric acid
Sulfone bis butyric acid
Thio bis acetic acid
Sulfone bis acetic acid
p,p'-Dicarboxy diphenyl
1,4-dicarboxynaphthalene
Pinic acid
Norpinic acid
Homopinic acid Polyaminotriazoles suitable for use in accordance with this invention include polymers having an inherent viscosity of at least 0.3 and preferably from 0.3 to 0.7 in 0.1 wt. percent solution in m-cresol at 25° C.

When the polyaminotriazoles are prepared by the reaction of the dihydrazide and aqueous hydrazine, the preferred conditions for obtaining a product of the molecular weight specified above include a temperature between about 140° and 260° C., an amount of hydrazine between about 30 and 33 percent by weight, based on the weight of the dihydrazide, an amount of water between about 6 and 7 percent, based on the weight of the dihydrazide and a reaction period between about 18 and 24 hours.

Polyaminotriazoles, suitable for use in accordance with this invention may be prepared in other ways, as for example by the reaction of one mole of a dicarboxylic acid with more than two moles of aqueous hydrazine.

A complete description of the polyaminotriazoles suitable for use in accordance with this invention and of the methods for making such polyaminotriazoles may be found in U.S. Patent 2,512,601 of Bates et al. and U.S. Patent 2,512,667 of Moncrieff et al.

Amine-substituted triazines constitute another suitable class of amidine compounds.

The preferred compounds of this class are amine-substituted derivatives of symmetrical triazines, including guanamines (2,4-diamino sym. triazines), melamine (2,4,6-triamino sym. triazine) and substituted melamines. The amino groups may be primary, secondary or tertiary and other substituents such as hydroxyl substituents may be present. Among the specific compounds which are suitable are 2,4-diamino-6-phenyl sym. triazine (benzoguanamine), 2,4-diamino-6-methyl sym. triazine, 2,4-diamino-6-butyl sym. triazine, 2,4-diamino-6-benzyloxy sym. triazine, 2,4-diamino-6-butoxy sym. triazine, 2,4-diamino-6-cyclo-hexyloxy sym. triazine, 2,4-diamino-6-chloro sym. triazine, 2,4-diamino-6-mercapto sym. triazine, 2,4-dihydroxy-6-amino sym. triazine (ammelide), 2-hydroxy 4,6-diamino sym. triazine (ammeline), N,N,N',N' tetracyanoethyl benzoguanamine, 2,4,6-triamino sym. triazine (melamine), phenyl melamine, butyl melamine, N,N-diphenyl melamine, N,N-diallyl melamine, N,N'N''-triphenyl melamine and N,N',N''-trimethylol melamine.

Compounds with an imidazoline nucleus constitute still another suitable class of amidine compounds. Suitable compounds of this class include those having the formula

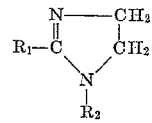

wherein $R_1$ and $R_2$ are monofunctional radicals. An especially preferred class of compounds are those wherein $R_1$ is a long chain aliphatic hydrocarbon group such as an alkyl group, a monoolefinic group or a diolefinic group. $R_2$ may be a short chain aliphatic radical and may contain other functional groups, such as omega hydroxy groups or omega amine groups. 2-aminoethyl and 2-hydroxyethyl groups are particularly useful at the $R_2$ position.

Among the specific imidazoline compounds which are useful are those sold in the trade as "Nalcamines," including "Nalcamine G–11" wherein $R_2$ is a 2-hydroxyethyl group and $R_1$ is a mixture of 11, 13, 15 and 17 carbon aliphatic groups, "Nalcamine G–12" wherein $R_2$ is a 2-hydroxyethyl group and $R_1$ is a mixture of heptadecenyl and heptadecadienyl radicals, "Nalcamine G–13" wherein $R_2$ is a 2-hydroxyethyl group and $R_1$ is a heptadecenyl group, "Nalcamine G–14" wherein $R_2$ is a 2-hydroxyethyl group and $R_1$ is a mixture of pentadecyl and heptadecyl groups, and "Nalcamine G–39M" wherein $R_2$ is a 2-aminoethyl group and $R_1$ is a mixture of heptadecenyl and heptadecadienyl groups. Other suitable imidazoline compounds include compounds of the above formula wherein $R_1$ is hydrogen or a lower alkyl group, such as a methyl, ethyl, isopropyl or butyl group.

The amidine compound is used for example, in an amount up to 5 weight percent and preferably from about 1 to about 0.1 weight percent based on the weight of the copolymer.

The 2-hydroxy benzophenone, and if desired the phenolic and amidine compound, may be mixed with the copolymer by any suitable technique, e.g., by dry-blending in a Henschel mixer followed by melt extrusion and pelletizing; by milling between two heated rolls and chopping into molding granules; or by milling in Banbury mixer or Brabender Plastograph. In the use of the hot rolling, Banbury, or Plastograph techniques, the 2-hydroxy benzophenone is preferably added as late as possible during the milling procedure. The phenolic compound and the 2-hydroxy benzophenone may also be dissolved in a solvent such as methanol or ethanol, blended with the polymer and the solvent removed by evaporation.

The compositions of this invention may also include, if desired, plasticizers, fillers, pigments and other stabilizers.

The following examples further illustrate the invention:

Example I

A copolymer of trioxane and dioxolane which was prepared with the aid of a boron trifluoride catalyst and was thermally after-treated to remove 5–10% oxymethylene groups at the ends of the polymer chains, and which contained 4.7 of combined dioxalane based on the weight of the copolymer and had an inherent viscosity of 1.7 (measured at 60° C. from a solution containing 0.1 weight percent of polymer in p-chloro-phenol containing 2 weight percent of alpha-pinene), was dry blended with 1 weight percent of 2-hydroxy-4-methoxy benzophenone, 0.5 weight percent of 2,2'-methylene bis (4-methyl-6-t-butyl phenol), and 0.1 weight percent of cyanoguanidine, based on the weight of the copolymer and milled for 7 minutes at 190° C. in the Brabender Plastograph.

The composition was compression molded at 190° C. and 1500 p.s.i. for 4 minutes to produce discs having a diameter of 2¼ inches and a thickness of 55 mils.

One disc was exposed in a X–1A Weatherometer (artificial weathering apparatus type D described in ASTM E–42–57). In comparison with the unexposed disc, the exposed disc showed severe surface degradation after 1400 hours in the Weatherometer as indicated by the formation of an opaque white surface encrustation. After 1700 hours in the Weatherometer, the disc showed an increase of 15 in Hunter "L" (lightness) value, determined on the sample without backing in the color meter described in ASTM D–1365–55T.

The average thermal degradation rate of the composition before molding or exposure in the Weatherometer was .036 percent loss of weight per minute when maintained in an open vessel in a circulating air oven at 230° C. for 45 minutes.

*Example II*

The procedure of Example I was followed except that the 2-hydroxy benzophenone employed was 2-hydroxy-4-n-octoxy benzophenone. The composition had an average thermal degradation rate 0.030 percent per minute before exposure; it was visibly degraded after 1400 hours in the Weatherometer, and showed an increase of 15 in Hunter Lightness after 1600 hours in the Weatherometer.

When the procedure of the above examples was followed except that no 2-hydroxy benzophenone was used at all, the composition had an average thermal degradation rate of .022 percent per minute before exposure, and showed severe surface degradation after 500 hours and an increase of 15 in Hunter "L" value after 450 to 500 hours in the Weatherometer.

*Example III*

The procedure of Example I was followed except that the polymer was a copolymer of trioxane and ethylene oxide prepared with the aid of a boron trifluoride catalyst and thermally aftertreated to remove 5–10 percent of oxymethylene groups at the ends of the polymer chains and which contained 2.8 weight percent of ethylene oxide based on the weight of the copolymer and had an inherent viscosity of 1.6 determined as described in Example I. The composition had an average thermal degradation rate of 0.36 percent per minute before exposure, and showed severe surface degradation after 1000 hours and an increase of 15 in Hunter "L" value after 1600 hours in the Weatherometer.

*Example IV*

The procedure of Example III was followed except that the 2-hydroxy benzophenone used was 1 weight percent of 2-hydroxy-4-methoxy-4'-chloro benzophenone. The composition had an average thermal degradation rate of .022 percent per minute before exposure and showed severe surface degradation after 1000 hours and an increase of 15 in Hunter "L" value after 1500 hours in the Weatherometer.

*Example V*

The procedure of Example III was followed except that the 2-hydroxy benzophenone used was 3 weight percent of 2-hydroxy-4-n-octoxy benzophenone. The sample had an average thermal degradation rate of .036 percent per minute before exposure and showed severe surface degradation after 1300 hours and an increase of 15 in Hunter "L" value after 1700 hours in the Weatherometer.

When the procedure of Examples III to V was repeated except that no 2-hydroxy benzophenone was used, the sample showed severe surface degradation after 400 hours and an increase of 15 in Hunter Lightness after 550 hours in the Weatherometer, and the average thermal degradation rate of the sample before molding and exposure was .020 weight percent per minute.

*Example VI*

A copolymer of trioxane and 2 percent by weight of ethylene oxide, based on the weight of the copolymer, prepared and treated as described in Example I and having an inherent viscosity of 1.3 determined as described in Example I, was dry blended with 0.5 percent of "Santowhite" (4,4'-butylidene bis(3-methyl-6-tertiary butyl phenol) and 0.7 percent of "Zytel 61" (a copolyamide of about 62 molar proportions of hexamethylene diamine, about 35 molar proportions of adipic acid, 27 molar proportions of sebacic acid and 38 molar proportions of caprolactam), the percentages being based on the weight of the copolymer. The blend was loaded into the Brabender Plastograph at 190° C. under a nitrogen atmosphere. After 3 minutes of milling at a rotor speed of 30 r.p.m., 1 percent of 2-hydroxy-4-methoxy-4'-chloro benzophenone, based on the weight of the copolymer was added and the milling continued for another 4 minutes.

The resulting composition showed an average thermal degradation rate at 230° C. of only .018 percent by weight per minute, which was substantially the same as the thermal degradation rate of the same composition but containing no benzophenone compound, in addition to exhibiting substantially less surface degradation on being exposed in the Weatherometer that the same compositions containing no benzophenone compound.

To illustrate the superior results obtained with the combination of a 2-hydroxy benzophenone and the copolymers of this invention, an acetylated homopolymer of formaldehyde having an inherent viscosity of 1.3 determined as described in Example I, and a melting point of 176–177° C., and containing 0.7 weight percent of "Zytel 61" and 0.4 weight percent of "Santowhite" which is a commercial thermal stabilizer combination for such homopolymer, was mixed with 1 percent by weight of 2-hydroxy-4-methoxy-4'-chloro benzophenone. The thermal degradation rate of the resulting composition was .07 to .09 weight percent per minute measured at 222° C. in a circulating air oven. When no 2-hydroxy benzophenone compound was added to the composition, the thermal degradation rate was 0.02 weight percent per minute at 222° C. It can thus be seen that the addition of only 1 percent of a 2-hydroxy benzophenone to a thermally stabilized oxymethylene homopolymer resulted in a substantial increase in the thermal degradation rate. This may be contrasted with the results illustrated in the foregoing examples in which the addition of up to 3 percent of a 2-hydroxy benzophenone to thermally stabilized oxymethylene copolymers containing carbon-to-carbon bonds is shown to result in only relatively slight increases in the thermal degradation rate.

It is to be understood that the foregoing detailed description is given merely by way of illustration and that many variations may be made therein without departing from the spirit of my invention.

Having described my invention what I desire to secure by Letters Patent is:

1. A composition of matter having an improved weathering stability comprising
   (1) an oxymethylene copolymer having a melting point of at least 150° C. and having at least one chain containing
      (a) from about 85 to 99.6 mol percent of oxymethylene units interspersed with
      (b) 0.4 to about 15 mol percent of oxyethylene units,
   (2) an alkylene bisphenol as a thermal stabilizer, and
   (3) from about 0.2 to about 5 weight percent, based on the weight of said copolymer, of a 2-hydroxy benzophenone selected from the group consisting of
      (a) 2-hydroxy-4-methoxy benzophenone,
      (b) 2-hydroxy-4-n-octoxy benzophenone, and
      (c) 2-hydroxy-4-methoxy-4'-chloro benzophenone such that the presence of said 2-hydroxy benzophenone results in a smaller percentage increase in thermal degradation rate of said copolymer than is the case when the same amount of said 2-hydroxy benzophenone is mixed with an oxymethylene homopolymer.

2. The composition of matter of claim 1 wherein said 2-hydroxy benzophenone is 2-hydroxy-4-methoxy benzophenone.

3. The composition of matter of claim 1 wherein said 2-hydroxy benzophenone is 2-hydroxy-4-n-octoxy benzophenone.

4. The composition of matter of claim 1 wherein said 2-hydroxy benzophenone is 2-hydroxy-4-methoxy-4'-chloro benzophenone.

References Cited by the Examiner

UNITED STATES PATENTS

| | | | |
|---|---|---|---|
| 2,350,350 | 6/1944 | Gresham | 260—67 |
| 2,682,559 | 6/1954 | Stanley et al. | 260—45.95 |
| 2,976,259 | 3/1961 | Hardy et al. | 260—45.95 |
| 3,006,959 | 10/1961 | Armitage et al. | 260—45.95 |
| 3,046,249 | 7/1962 | Hermann et al. | 260—67 |
| 3,050,500 | 8/1962 | Sherwood | 260—67 |
| 3,094,506 | 6/1963 | Weinberg et al. | 260—45.95 |
| 3,103,499 | 9/1963 | Dolce et al. | 260—67 |

FOREIGN PATENTS 807,589   1/1959   Great Britain.

WILLIAM H. SHORT, *Primary Examiner.*